G. H. HOLMES.

Take-Up for Loom.

No. 8,298. Reissued June 25, 1878.

Witnesses:
H. N. Gale.
W. B. Thomson.

Inventor:
George H. Holmes.
By James Shepard
Atty.

N. PETERS, PHOTO-LITHOGRAPHER, WASHINGTON, D. C.

UNITED STATES PATENT OFFICE.

GEORGE H. HOLMES, OF NEW BRITAIN, CONNECTICUT.

IMPROVEMENT IN TAKE-UPS FOR LOOMS.

Specification forming part of Letters Patent No. 93,441, dated August 10, 1869; Reissue No. 8,298, dated June 25, 1878; application filed November 6, 1877.

*To all whom it may concern:*

Be it known that I, GEORGE H. HOLMES, late of New Brunswick, in the county of Middlesex and State of New Jersey, now of New Britain, in the county of Hartford and State of Connecticut, have invented certain new and useful Improvements in Take-Ups for Looms; and I do hereby declare that the following is a full, clear, and exact description thereof, which will enable others skilled in the art to make and use the same, reference being had to the accompanying drawings, forming part of this specification.

This invention relates to looms, and has particular reference to the "take-up" of the fabric; and it consists in the combination of mechanism by which the tension of the cloth is regulated.

Figure 1:
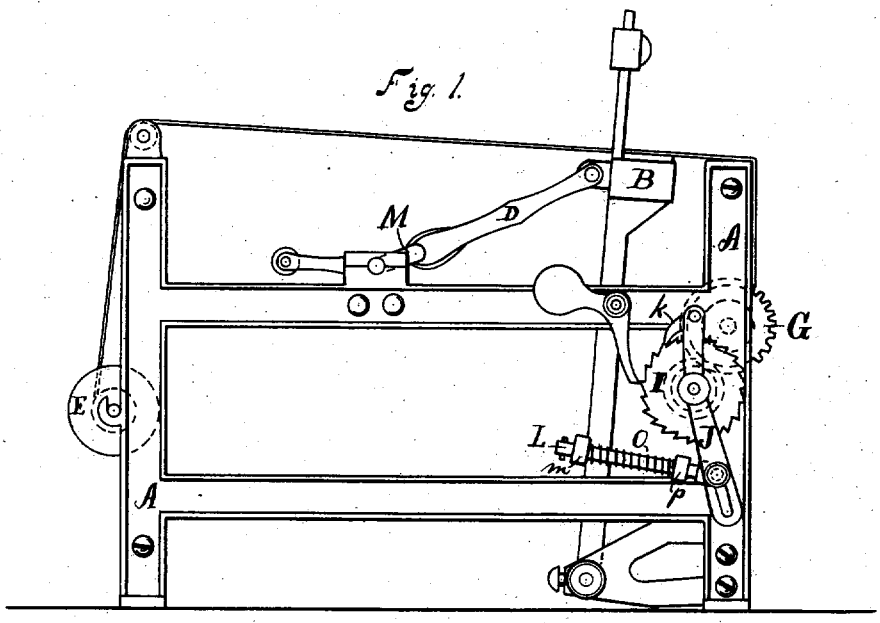
Figure 2:
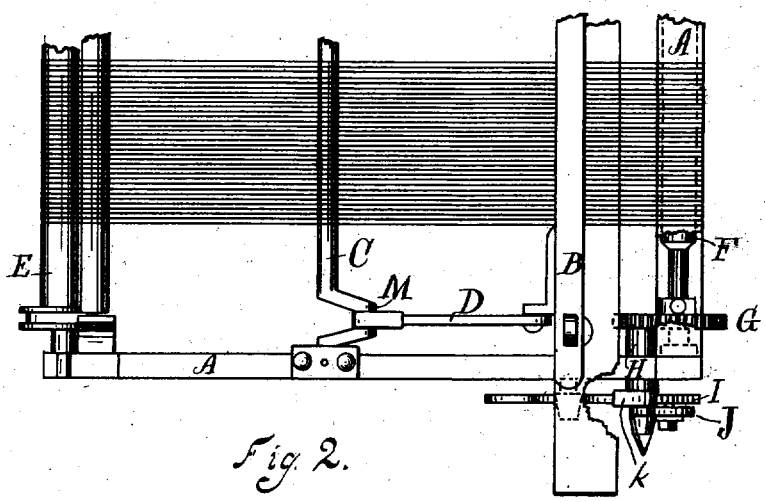

In the accompanying drawings, Figure 1 represents an end elevation of a weaving-loom, showing the take-up mechanism applied thereto, by which the tension is controlled; and Fig. 2 is a top view of the same loom.

Similar letters of reference indicate corresponding parts.

A represents the frame of the loom; B, the lay; C, the crank-shaft, carrying the crank M, by which the lay is operated; D, the connecting-rod, which connects the crank with the lay; and E, the warp-beam. F represents the cloth beam or roll which takes up the fabric, the frame in Fig. 2 being broken away to show a part of the same. G is a gear-wheel at the end of the beam F, which gear-wheel meshes into another and smaller wheel on a short shaft which passes to the outside of the loom through a sleeve-box, H, attached to the frame. This shaft in this loom bears the ratchet-wheel I. J is an oscillating pawl-carrier, upon which is pivoted a dog or pawl, *k*, which engages with the teeth of the ratchet-wheel I, whereby the beam which imparts tension to the fabric is revolved when the fabric is taken up. Motion is imparted to the pawl and its carrier by the rod L, one end of which is secured to the oscillating pawl-carrier J, and the other end rests loosely in the sliding collar *m*.

There may be a slot in the end of the oscillating pawl-carrier, so that the pawl *k* can be adjusted to larger or smaller ratchet-wheels, if desired, and so that the throw of the pawl *k* may be increased or diminished at pleasure.

On the rod L there is a spiral spring, O, one end of which bears against the sliding collar *m*, which in this loom is mounted upon the lay, through which it receives a reciprocating motion from the crank M, while the other end bears against a stop-nut, *p*, upon the rod, by which the tension of the spring is increased or diminished, as may be desired. The sliding collar *m*, when the fabric is strained, slides on the rod L against the spring O, compressing the spring at each movement of the sliding collar in the direction of the stop-nut, and releasing the same at each movement of the collar in the opposite direction.

It is obvious that when a reciprocating motion is given to the sliding collar *m* the degree of compression of the spring, and the consequent extent of motion of the pawl and the ratchet-wheel, will depend upon the resistance or tension of the fabric. Thus, if the cloth is slack, the spring will be but slightly (if at all) affected by the movement of the sliding collar *m*, the strength of the spring being sufficient to move the pawl and revolve the ratchet-wheel and take up the fabric, in which case the collar *m* will move with the rod L, and not slide on it; but when there is sufficient tension on the cloth to overcome the power of the spring, the collar will slide on the rod and expend its blow or pressure in compressing the spring, and will not throw the pawl or move the ratchet.

By this arrangement of the parts which constitute the take-up mechanism it is believed that a better result is obtained than by any method now in use, the texture of the fabric being left even and uniform.

I do not confine myself to the use of a spiral spring, as other forms of springs may be applied to produce the same or a similar effect.

I am aware that take-ups have been made in which the movement of the lay in one direction operated to draw a pawl backward over the teeth of the ratchet-wheel which drove the cloth-beam, and at the same time the lay operated to expand a spiral spring, which spring, upon the return movement of the lay, would contract to throw the pawl and ratchet-wheel forward whenever the power of the spring was sufficient to overcome the tension of the cloth.

I am also aware that a ratchet-wheel, weighted pawl-carrier, and pawl have been combined with the lay of a loom to operate in a similar manner, so that the lay, in moving in one direction, lifted the weighted pawl-carrier, and the weight would operate to drive the ratchet-wheel forward upon the return movement of the lay, both of which prior devices are hereby disclaimed.

I claim as new and desire to secure by Letters Patent—

1. In a take-up device for looms, the combination of the ratchet-wheel I, through which motion is imparted to the beam which takes up the fabric, the oscillating pawl-carrier J, provided with the pawl *k*, the rod L, spring O, stop-nut *p*, and reciprocating sliding collar *m* and operating mechanism, whereby the positive reciprocating motion imparted to the sliding collar is made to turn the ratchet-wheel a greater or less distance, according to the tension of the fabric, substantially as described.

2. In a take-up device for looms, the combination of the stop-nut *p*, the rod L, spring O, sliding collar *m*, the crank M, and suitable intermediate mechanism, substantially as described, whereby the rotary motion of the crank is transformed into the compensatory reciprocating motion of the rod L, for the purpose set forth.

GEORGE H. HOLMES.

Witnesses:
W. B. THOMSON,
JAMES SHEPARD.